US008160740B2

(12) United States Patent
Zimmermann

(10) Patent No.: US 8,160,740 B2
(45) Date of Patent: Apr. 17, 2012

(54) SORTING SYSTEM WITH STORAGE REGISTERS AND A STORAGE MODULE WITH LAST-IN/FIRST-OUT OPERATION AND AUTOMATIC MAIL ITEM FEEDBACK

(75) Inventor: Armin Zimmermann, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 1001 days.

(21) Appl. No.: 11/985,974

(22) Filed: Nov. 19, 2007

(65) Prior Publication Data

US 2008/0121572 A1 May 29, 2008

(30) Foreign Application Priority Data

Nov. 24, 2006 (DE) ......................... 10 2006 055 947

(51) Int. Cl.
*G06F 7/00* (2006.01)

(52) U.S. Cl. ........................................ 700/223; 209/584

(58) Field of Classification Search .................. 700/223, 700/224; 209/552, 584, 583; 271/3.01, 256, 271/3.05, 3.06
See application file for complete search history.

(56) References Cited

U.S. PATENT DOCUMENTS

| | | | | |
|---|---|---|---|---|
| 4,757,904 | A | 7/1988 | Ozawa | |
| 5,287,271 | A * | 2/1994 | Rosenbaum | 705/7.12 |
| 6,598,768 | B2 * | 7/2003 | Celli | 222/400.7 |
| 2002/0074268 | A1 * | 6/2002 | Hendrickson et al. | 209/542 |
| 2007/0205143 | A1 | 9/2007 | Zimmermann et al. | |

FOREIGN PATENT DOCUMENTS

| | | | |
|---|---|---|---|
| DE | 1 286 966 | | 1/1969 |
| DE | 27 44 748 | A1 | 4/1979 |
| DE | 196 09 068 | A1 | 9/1997 |
| EP | 0 214 598 | A2 | 9/1986 |
| EP | 0214598 | A2 | 3/1987 |
| WO | 9732674 | A1 | 9/1997 |

OTHER PUBLICATIONS

Derwent Abstract—DE-196 09 068 A1; Sep. 11, 1997; AEG Electrocom GmbH, D-78467 Konstanz, Germany.
Derwent Abstract—DE-27 44 748 A1; Apr. 12, 1979; Standard Elektrik Lorenz AG, D-7000 Stuttgart, Germany.

* cited by examiner

*Primary Examiner* — Ramya Burgess
(74) *Attorney, Agent, or Firm* — Laurence A. Greenberg; Werner H. Stemer; Ralph E. Locher

(57) ABSTRACT

A sorting system for mail items includes sorting registers, a storage module operating on a last-in/first-out principle, a sorting circuit to convey a stream of mail items. The sorting registers and the storage module are connected via switch points to the sorting circuit, wherein the storage module comprises a storage area and an insertion function. An extraction function extracts mail items from the storage area, and a process controller controls the mail item stream and the switch points. The process controller sets, if there is a conveyance fault, part of the switch points so mail items intended for the faulty sorting registers are introduced into the storage area. When the fault is rectified and/or a predefined occupancy level is reached, mail items stored in the storage area are extracted by adjusting a remaining feeding of mail items into the mail item stream, and fed to the sorting registers.

13 Claims, 3 Drawing Sheets

SORTING SYSTEM WITH STORAGE REGISTERS AND A STORAGE MODULE WITH LAST-IN/FIRST-OUT OPERATION AND AUTOMATIC MAIL ITEM FEEDBACK

CROSS-REFERENCE TO RELATED APPLICATIONS

The present application claims priority to German Patent Application No. 10 2006 055 947.9, filed on Nov. 24, 2006, which is incorporated herein by reference.

BACKGROUND OF THE INVENTION

The present invention relates to a sorting system for flat mail items with a number of sorting registers and at least one storage module, with the sorting registers and the at least one storage module being connected to a sorting circuit via switch points.

With today's mail sorting systems in some case very large volumes of mail items must be sorted and distributed at mail sorting centers and/or larger post offices. Thus for example the average daily volume of mail in Germany amounts to around 80 million letters which have to reach their addressees the day after being mailed or at the latest two days after being mailed. Such mail items are generally referred to by the generic term of letters. Such letters are identified by their length and their width generally being large in relation to their height. However, as regards the definitive dimensions for the assignment of the mail items to this "letters" group there are significant differences between the mail administrations of the various national states. As well as these deviations in size, it is easy to see that the nature of the mail items, even if they are all "letters," differs significantly under some circumstances.

It is thus easy to imagine that the processes of mail automation must be operated nowadays with high levels of efficiency and as a result of cost pressures also with a comparatively small number of operators. To achieve sufficiently high throughput rates in the sorting systems the mail items are conveyed through the sorting system at speeds of up to 4 m/s or in places at even greater speeds, and are sorted to their destination by appropriate switch point settings and a clever, generally multistage delivery round sorting system.

For rough and fine sorting of the mail items a number of sorting registers are thus connected via the switch points to the sorting circuit. In such cases each sorting register as a rule has a number of destinations which is generally at least in the double-digit range, to which the mail items destined for them are likewise directed by corresponding switch point settings. It is easy to see here that the switch points are only able to be switched using a certain time constant and that the mail items in the mail item stream must thus be at a specific distance from each other, to allow the switching processes for the switch points in precisely the intervals made possible by the minimum gap. At a speed of conveyance of around 4 m/s and a minimum distance of 70 mm for example this time window for switching a switch point amounts to just 17.5 1 ms. Because of the short intervals, mail items which are not at the required minimum distance from the previous item must be extracted from the stream of mail items in order to create the required gaps. This likewise applies to mail items which are fed to a sorting register of which the function is disturbed because of a blockage or as a result of a compartment overflow. So that the entire sorting process does not have to be halted, the mail items destined for the faulty sorting register are also extracted from the stream of mail items.

In the prior art these mail items had to be taken back manually to the so-called feeder and then had to be introduced there back into the sort circuit by reentering their destination address.

SUMMARY OF THE INVENTION

The underlying object of the present invention is thus to refine a sorting system to the extent where the task of buffering mail items during sorting faults can be executed with an extraordinarily low process error rate and the feedback of the buffered mail items extracted because of the sorting fault can be executed automatically.

In accordance with the invention this object is achieved by a sorting system of the type mentioned at the start, which includes:

- a number of sorting registers and at least one storage module operating according to a last-in/first-out principle, with the sorting registers and the storage module being connected via switch points to a sorting circuit conveying a stream of mail items, and with the storage module having an insertion function which transfers mail items from a mail item stream into the storage area and an extraction function which extracts the mail items from the storage area for feedback into the mail item stream;
- a process controller for controlling the return flow of items and the switch points, with the process controller, if there is a conveyance fault in a sorting register, setting at least some of the switch points so that the mail items intended for the faulty sorting register are able to be fed into the storage area of the storage module while their sorting specification is memorized, and when the fault is rectified and/or when a predefined occupancy in the storage area is reached, the mail items stored in the storage area can be extracted while setting the remaining feeding of mail items into the mail item stream and are able to be directed to the sorting register corresponding to their sorting specification.

In this way it is possible to first buffer the extracted mail items while achieving a precise orientation on two edges in the at least one storage module and, after the fault has been rectified, to extract the mail items from the storage area so that they can be very precisely positioned and are suitably spaced. During this time, although the normal feeding in of items takes place, it is even possible for the process controller, in the optimum state even while retaining the address information to be able to feed back the extracted mail items in a fully-automated way. Basically there is provision however, because of the danger of double extractions which is never entirely to be excluded, to re-enter that address as the mail items are being extracted from the storage area.

Since the storage module or modules provided for accommodating the extracted mail items only have a finite storage capacity however, to maintain the uninterrupted operation of the sorting system there is provision for the sorting system, if the fault in a sorting register lasts for a long period, to replace the faulty, sorting register by a non-faulty sorting register at least temporarily. In this case the trigger for the assignment of a new sorting registers can for example be that a predefined occupancy level has been reached. Advantageously a predetermined reserve storage capacity can than be available, with the process controller undertaking the assignment of a faulty sorting register to a non-faulty sorting register while this reserve capacity is being filled up.

In a further advantageous embodiment of the invention there is provision, with the rectification of fault, for the assignment of the previously faulty sorting register to the non-faulty sorting register to be cancelled again. In this way the previous state is then reestablished, which can be advantageous for the further execution of the sorting process and enables a "reserve" sorting register to be provided once more. Despite this it can however be possible to retain this assignment until all the mail items intended for the sorting run have been sorted into the sorting register.

The result is that an optimized mail item stream is produced since the mail items are correctly spaced and can be extracted from the storage area with known address information (either using barcodes and/or also IT systems) in the process controller. Because the storage module is also operating in the insertion function or the extraction function, general conditions optimized for the respective function can be set, which significantly reduces the process error rate.

For setting the optimum conditions for the insertion function and for the extraction function in each case, each storage module can be equipped so that the insertion function and the extraction function include a common roller belt unit and a feed stop, with the insertion function or the extraction function optionally being executed, in that in the insertion function the mail items are able to be fed in the direction of conveyance of the roller belt unit against the feed stop and are thus able to be transferred into the storage area, and in that in the extraction function the last mail item inserted into the stack can be extracted in the direction of conveyance of the roller belt unit through an extraction opening from the storage area. In this way it is possible, while still using largely common components, for the insertion function and the extraction function, to functionally separate the insertion or storage of mail items in the stack and the extraction of mail items which in these process stages for reasons of expediency are generally conveyed in largely vertical orientation and thus to be able to set the most favorable process parameters for each of the two processes. Unlike in the first-in/first-out operation (FiFo) known in the prior art, last-in/first-out operation is achieved in this way which, on storage of the items, can concentrate entirely on fulfilling the best possible general inwards storage conditions and on extraction can concentrate on the best possible general extraction conditions.

The feed stop which is especially important for the insertion of the items into storage, which makes it possible to center the mail items for later precise extraction on two side edges of the mail item, is rather counterproductive for the extraction function since the mail items, with their extraction from the storage area are preferably to be transferred onwards in the original feed direction. The extraction function is thus especially easy to implement in constructional terms, if, to create the extraction opening, the feed stop can be moved in the stack direction (the direction in which the stack is growing in the storage area). The last mail items stored will thus then be conveyed from the roller belt unit essentially in the orientation of the mail item in the storage area (or at any rate be conveyed in a vectoral transition which still has a perceptible component in the storage orientation) and can for example be inserted in this way into the ongoing stream of mail items.

The contact pressures on the roller belt unit optimized in each case for the insertion function and the extraction function can be particularly well implemented if the storage area features a separating blade, with which, if the insertion function is in place, a first pressure is able to be exercised antiparallel to the stacking direction on at least one part of the mail items stored in the storage area and with which, if the extraction function is in place, a second pressure is able to be exercised antiparallel to the stacking direction on at least one part of the mail items stored in the storage area. The stack direction in this case means the direction in which the stack is growing if mail items continue to be introduced into the storage area. Advantageously this separator blade can be driven by an underfloor belt or also separately, which in this way is able, independently of the stack size, to create a constant contact pressure on the roller belt for each of the mail items routed onto the roller belt unit.

In a further advantageous embodiment of the invention, to achieve especially suitable downwards pressure conditions on the mail items which are currently being conveyed with the roller belt unit for insertion into storage or for extraction, there can be provision for setting the first pressure as a function of at least one characteristic of the current mail item to be stored and/or the second pressure as a function of at least one characteristic of the last mail item stored. Such a characteristic can for example be the thickness and/or the length of a mail item or also the surface properties of a mail item.

Typically specific limit values will be set in agreement with the (mail) customers for the mail items which can be sorted with these sorting machines. These types of limit value are primarily the dimensions of the mail items, i.e. their minimum and maximum width, length and height, and then as a secondary consideration for example also their weight or their external nature. The roller belt unit which carries the mail items in the insertion function up to the feed stop, can thus be dimensioned in an advantageous embodiment of the invention so that a section of a driven roller belt included in the roller belt unit adjacent to the storage area is shorter than the shortest mail item length defined. In this way the process of storage is supported insofar as the roller belt does not engage with the entire mail item and thus does not convey the mail item with the drive forces transmitted by friction too heavily against the feed stop, whereby process errors (creased mail item and blocking of the process) can be even better avoided at this point.

An initial position which differs from this for the extraction of the mail items from the storage area can be taken as read. After the stored mail items are arranged very tidily on two edges centered in the storage area, for the optimum further processing (further conveyance) of the mail items there is the requirement to be able to extract the mail items from the storage area in a very defined way. A parameter already mentioned previously which supports the extraction process is the selection of the correct pressure of the last stored mail item on the roller belt unit. This process can be supported especially advantageously if, when the extraction function is taking place, at least one pivotable support roller is provided to support the last mail item stored, with the at least one support roller being pivoted away when the insertion function is taking place. This at least one support roller which is actually only needed for the extraction function and is thus pivoted down for the extraction function, ensures that the entire mail item is essentially arranged in parallel to the plane of conveyance of the roller belt and thus the drive force of the roller belt can be transmitted very homogeneously to the part of the mail item in contact with the roller belt.

For the insertion function, as well as an optimized first pressure a series of further parameters are identified which help to avoid process errors. Such a parameter can for example be the direction in which mail items are fed to the roller belt unit. In an advantageous embodiment of the invention the direction of feeding of the mail items in the mail item stream can thus be set so that the feed direction runs at an angle to the alignment of the mail items in the storage area. In this way it is possible to support the objective of the mail item, on introduction into the storage area, towards the end of this process only being in contact with the roller belt as regards how it is being driven and thus a defined guidance up to the feed stop being undertaken.

In a further advantageous embodiment of the invention the roller belt unit can include a roller belt driven by means of a servo motor. This provides both the insertion function and the extraction function with a jointly used roller belt, which is also very advantageous in terms of construction.

As an alternative to this there could however also be provision for the roller belt unit to include two roller belts able to be driven separately, with one of the two roller belts being in frictional contact during the insertion function with the mail items to be stored and the other of the two roller belts able to be brought into frictional contact during the extraction function with the mail items to be removed from the storage area. In this way for example roller belts with different coefficients of friction specified for the respective function can be used. Constructively however a little more effort is required for this solution, because a mechanism must be present which brings the two belts into frictional contact with the mail items depending on the function selected. A hinged device is conceivable here for example which swings one roller belt into a frictional contact position with the other roller belt being simultaneously swung out of the frictional contact position (and vice versa). A further alternative can also be an eccentric shaft which lifts the one roller belt into the frictional contact position and simultaneously lowers the other roller belt (and vice versa).

It is further especially advantageous for each of the previously mentioned roller belts to be able to be driven by a servo motor which drives the roller belt with a predeterminable profile. In this way it is possible for example, at the end of the insertion movement, to drive the mail item more slowly and thus to move it softly against the feed stop. For very short mail items there can even be provision for stopping the mail item for a time before it reaches the feed stop. The stopping point can for example be defined as a location at which the rear edge of the comparatively short mail item (and thereby also the front edge important for correct positioning) is still sufficiently far away from the feed stop to enable the mail item with the further movement of the roller belt to be driven at the speed required for the next mail items, before deceleration for the soft approach to the feed stop is provided.

To largely decouple the frictional contact of the mail items along with all the components described previously for conveying the mail items from the gravitational force of the mail items, there is provision in an advantageous development of the invention to essentially align the mail items vertically and/or align them lying on their long edges.

BRIEF DESCRIPTION OF THE SEVERAL VIEWS OF THE DRAWINGS

The novel features and method steps characteristic of the invention are set out in the claims below. The invention itself, however, as well as other features and advantages thereof, are best understood by reference to the detailed description, which follows, when read in conjunction with the accompanying drawings, wherein:

DETAILED DESCRIPTION OF THE INVENTION

Figure 1:
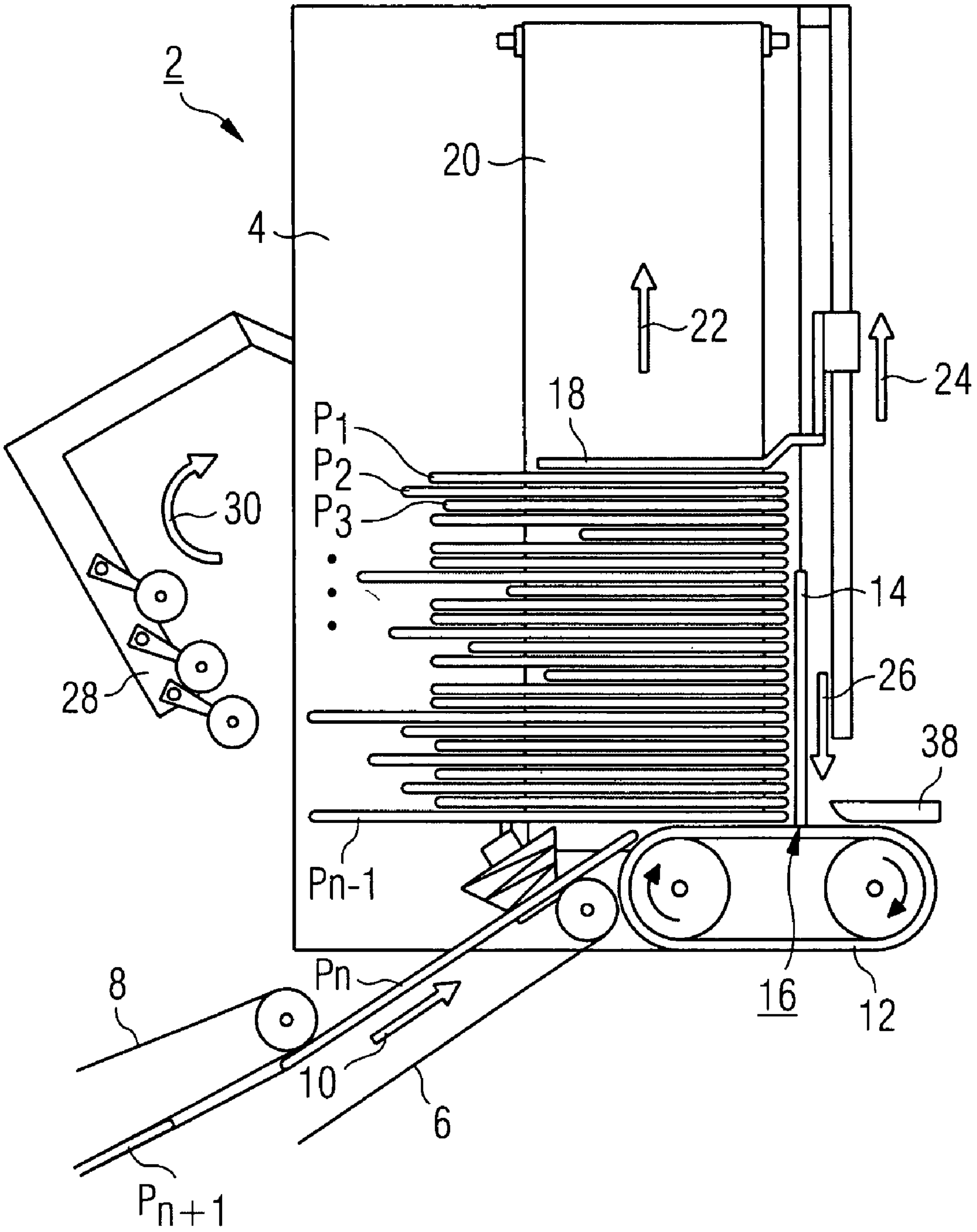
FIG. 1 shows a schematic view of a storage module during insertion of items.
Figure 2:
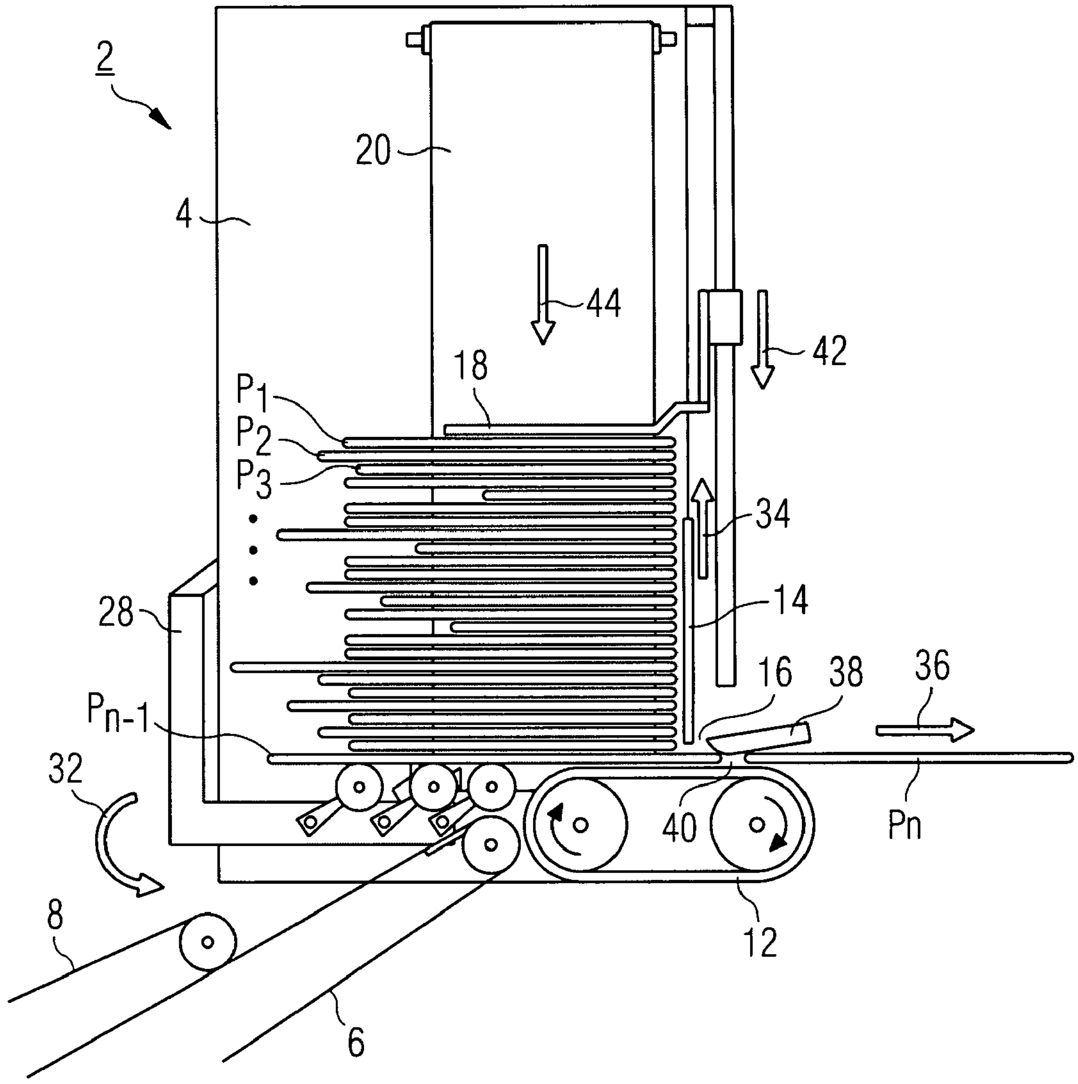
FIG. 2 shows a schematic view of the storage module shown in FIG. 1 during extraction of items.

It should be stated at the outset that the views depicted in FIGS. 1 and 2 illustrate the essentially vertical orientation of the mail items. In FIGS. 1 and 2 the views thus only show the top edge of the mail items.

FIG. 1 shows a schematic view from above of the inventive storage module 2, which is operating in the insertion function in the diagram shown. The storage module 2 comprises a storage area 4 in which mail items $P_1, P_2, P_3, \ldots, P_{n-1}$ are currently stored. In the diagram shown mail item $P_n$ will be the next mail item transferred into the storage area 4. This mail item $P_n$ is fed forwards between two feed belts 6, 8 to the storage module 2 in the direction of an arrow 10—referred to below as the direction of conveyance 10—and then picked up by a roller belt 12 of the storage module 2. The roller belt 12 is driven in a controlled manner in this case and conveys the mail items $P_1, P_2, P_3, \ldots, P_{n-1}$ to a feed stop 14, by which the mail items $P_1, P_2, P_3, \ldots, P_{n-1}$ are then located relative to their front edge and their bottom edge in a precisely defined position in the storage area 4. The feed stop 14, in the position shown in FIG. 1, also blocks an extraction opening 16, which will be discussed in greater detail in the description for FIG. 2. An arrow 26 is thus intended to indicate that the feed stop 14 in the view shown is guided (downwards) to immediately before the roller belt 12.

For the exact positioning of the mail items $P_1, P_2, P_3, \ldots, P_{n-1}$ in the storage area 4 it is thus essential for the mail items $P_1, P_2, P_3, \ldots, P_{n-1}$ to be brought with a certain feed pressure into contact with the roller belt 12. It can easily be seen that because of too little feed pressure only a delayed conveyance of the current mail item to be stored, here mail item $P_n$, and an undesired overlapping with a subsequent mail item $P_{n+1}$ could occur. This can cause the mail item $P_n$ to no longer be correctly fed up to the feed stop 14. By contrast, a feed pressure which is too high, for only slightly rigid mail items, can cause creasing or folding of the mail item before the feed stop 14 in an undesired way with the consequence that the creased/folded mail item may have to be made to slide again manually. With the prevailing speeds of conveyance of several meters per second for the mail items (outside the storage area 4 it is easy to deduce that each process fault mostly not only affects one mail item, but as a rule always affects a whole series of mail items within a conveyance path.

For setting an optimized feed pressure in this context a separation blade 18 and an underfloor belt 20 are provided which are able to be moved under very fine control in the insertion function of the storage module 2 in the stacking direction in accordance with arrows 22, 24. By means of the separating blade 18 a first pressure is created in this way antiparallel to the direction of insertion into the stack, in order to set the desired feed pressure on the roller belt 12 for the mail item to be stored in the stack.

The storage module 2 further features a support roller arrangement 28 which in the insertion function shown in FIG. 1 is hinged out in an inactive state. An arrow 30 is intended here to illustrate the typical direction in which the hinging device of the support roller arrangement 28 moves.

FIG. 2 now shows a schematic view of the storage module 2, which is operated here in its extraction function. By contrast with the insertion function a number of components of the storage module are now in a different position. The support roller arrangement 28 is now positioned in its hinged-down active state, which, as regards the hinging direction, is also to be indicated by an arrow 32. The support roller arrangement 28 makes sure that above all the next mail item to be extracted, here the mail item $P_{n-1}$, is oriented in a plane which corresponds essentially to the plane of conveyance spanned by the roller belt 12 and also in the local area of the storage module 2 essentially corresponds to the further direction of conveyance. In this way the mail item to be extracted lies flat against the roller belt 12 and can thus be extracted in a defined way.

To enable the mail item stored in the stack to be extracted at all, the feed stop 14 is moved away upwards in the extraction function in the direction indicated by the arrow 34 and thus reveals the extraction opening 16. The snapshot shown in FIG. 2 shows the mail item $P_n$ which has just been completely extracted and is being conveyed away in the direction of an arrow 36, and the mail item $P_{n-1}$, of which the front edge 40 is just passing through the extraction opening 16 and is being held in contact with the roller belt 12 by a wiper 38. The wiper 38 in this case helps to avoid double withdrawals, since its coefficient of friction is matched to the coefficient of friction acting on the roller belt and with a double extraction it holds back the mail item not in direct contact with the roller belt. So that the mail item $P_n$ could be conveyed with a very precisely defined orientation of its front edge and the mail item $P_{n-1}$ is currently being conveyed in this way, an optimized extraction pressure of the mail item on the roller belt 12 is now selected here. To this end a second pressure is set up by means of the separating blade 18 antiparallel to the stacking direction (cf. arrow 42). The setting of the correct extraction pressure is also of significance in the extraction function for avoiding process errors, since an extraction pressure which is too low can lead to an undesired slipping of the roller belt 12 and thereby to an imprecise conveyance of the current mail item to be extracted. On the other hand an extraction pressure which is too high can lead to a multiple extraction or even also to a sticking of the lower mail items shown in the drawing.

To enable the largely vertical orientation of the mail items located in the storage area 4 to be guaranteed even during the ongoing extraction of mail items, the underfloor belt 20 is also driven in the direction of an arrow 44 and thus, in conjunction with the pre-tensioned separating blade 18, moves the mail items stored in the storage area 4.

Figure 3:
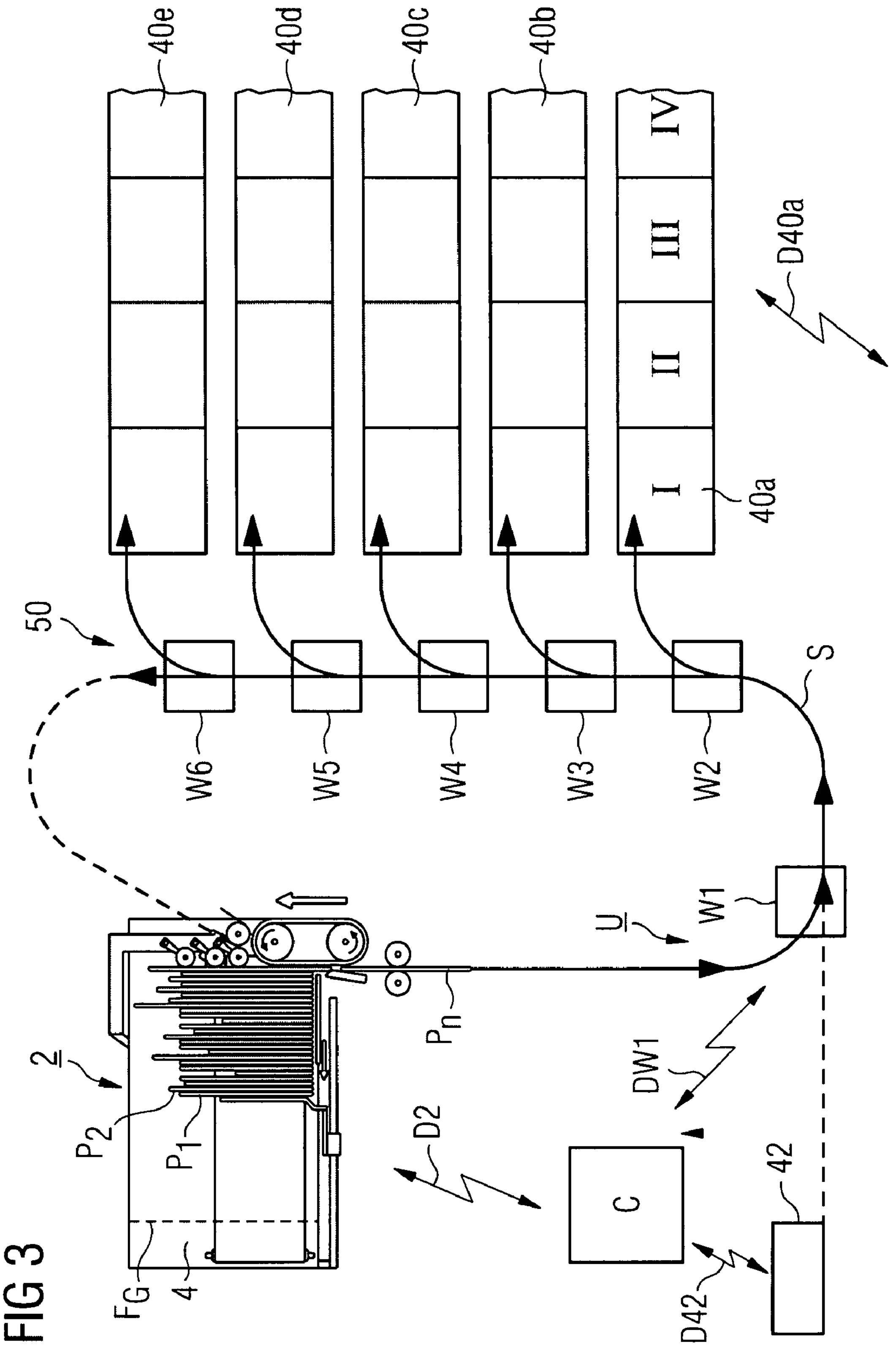
FIG. 3 shows a schematic diagram of a sorting system with five sorting registers and a storage module in accordance with FIGS. 1 and 2.

FIG. 3 now shows a typical arrangement of five sorting registers 40*a* to 40*e* and a storage module 2 in an inventive sorting system 50 for flat mail items $P_1$ to $P_n$ (the use of reference symbols from FIGS. 1 and 2 has been restricted to what is necessary in this figure). The sorting registers 40*a* to 40*e* each include a number of destination points I, II, III, IV etc., to each of which address information is assigned for sorting the mail items $P_1$ to $P_n$ by means of a process controller C. The sorting registers 40*a* to 40*e* and the storage module 2 are connected via switch points W1 to W6 to a sorting circuit U conveying a stream of mail items S.

In operation the mail items $P_1$ and $P_n$ will be fed by means of a feeder 42 into the sorting circuit U: When this is done the process controller C and the feeder 42 exchange control data D42 which is to be indicated by bidirectional arrow shaped like a lightning symbol. Depending on the sorting registers 40*a* to 40*e* provided, the mail items for sorting to their destination are sorted by means of the corresponding setting of the switch points W2 to W6 (exchange of data DW1 etc.) into the relevant sorting register 40*a* to 40*e*.

Should there now be a fault in one or even in more than one of the sorting registers 40*a* to 40*e*, for example caused by a blockage of mail items at an internal switch point, this is notified to the process controller C by an exchange of D40*a* etc. For a typical faulty sorting register 40*a* the process controller C will immediately only allow the non-diverting setting for the switch point W2 and the mail items $P_1$ to $P_n$ intended for the sorting register 40*a* will then only be stored fully automatically in the storage module 2.

FIG. 3 now shows the state after which the fault of the sorting register 40*a* has just be notified as rectified to the process controller C. Although a limit value $F_G$ for the occupancy of the storage area 4 of the storage module 2 is not yet reached, the process controller C stops the feeder 42 which the dashed line up to switch point W1 is intended to indicate. The storage module 2 has now been switched from the insertion function to the extraction function and the last mail item $P_n$ stored is just leaving the storage module 2 and is being sorted via the switch points W1 and W2 into the sorting register 40*a*. This process is continued until such time as the first stored mail item $P_1$ has also passed switch W1 and is on the way to the intended sorting register 40*a* to 40*e*. It should be noted that the stored mail items $P_1$ to $P_n$ did not absolutely have to be assigned to sorting register 40*a* but can belong to any sorting register 40*a* to 40*e* which has also developed a temporary fault in the interim, because of which the mail items intended for this register have likewise been stored in the storage module 2.

FIG. 3 thus shows in simplified form the process of buffering mail items for sorting registers with temporary faults while retaining the mail item's own address information. This address information for example read in the feeder 42 will be assigned in the process controller C to the corresponding mail item is retained if the mail item has had to be removed into the storage module 2 as a result of a fault in the relevant "destination" sorting register and buffered in this module. Thanks to the full automation capabilities of the storage module 2 incl. a likewise automatable gap control, the temporarily removed mail items are directed fully automatically to their assigned sorting register in this way.

What is claimed is:

1. A sorting system for flat mail items, comprising:

a number of sorting registers;

at least one storage module configured to operate on a last-in/first-out principle;

a sorting circuit configured to convey a stream of mail items in a stream direction, wherein said sorting registers and said at least one storage module are connected via switch points to said sorting circuit, wherein said at least one storage module has an outlet connected to said sorting circuit downstream of said switch point connections of said sorting registers in said stream direction and said at least one storage module has an inlet connected to said sorting circuit upstream said switch point connections of said sorting registers in said stream direction, and wherein said at least one storage module includes a storage area, an insertion function configured to transfer mail items from the stream of mail items into said storage area and an extraction function configured to extract the mail items from said storage area for a feedback into the mail item stream; and a process controller configured to control the mail item stream and said switch points, wherein said process controller is configured to set, if there is a conveyance fault in a sorting register, at least a part of said switch points so that the mail items intended for the faulty sorting registers are introduced into said storage area of said at least one storage module instead while memorizing a sorting definition of these mail items, and wherein, when the fault is rectified and/or a predefined occupancy level is reached in said storage area, these mail items stored in said storage area instead are extracted by adjusting a remaining feeding of mail items into the mail item stream and fed to said sorting registers corresponding to their initially assigned sorting definition.

2. The sorting system of claim 1, wherein, if the fault lasts longer in a sorting register, the process controller is configured to replace the faulty sorting register at least temporarily by a non-faulty sorting register.

3. The sorting system of claim 1, wherein when the predefined occupancy level is reached a predetermined reserve storage capacity is available, and wherein the process controller is configured to undertake an assignment of the faulty sorting register to a non-faulty sorting register while filling up the reserve storage capacity.

4. The sorting system of claim 3, wherein when the fault is rectified the assignment of the previously faulty sorting register to the non-faulty sorting register is canceled.

5. The sorting system of claim 1, wherein the insertion and extraction functions include a common roller belt unit and a feed stop, wherein the insertion function and the extraction function are selectively operable, in that in the insertion function the mail items in the direction of conveyance of the roller belt unit are transferable from the roller belt unit against the feed stop and thus into the storage area, and in that in the extraction function the last stacked mail item is extractable in the direction of conveyance of the roller belt unit through an extraction opening from the storage area.

6. The sorting system of claim 5, wherein the feed stop is configured to move in a stacking direction to create the extraction opening.

7. The sorting system of claim 5, wherein the storage area includes a separation blade configured to exert, if the insertion function is in place, a first pressure antiparallel to a stack direction on at least one part of the mail items stored in the storage area, and, if the extraction function is in place, a second pressure antiparallel to the stack direction on at least one part of the mail items stored in the storage area.

8. The sorting system of claim 7, wherein the separating blade is configured to be driven by means of an underfloor belt.

9. The sorting system of claim 7, wherein the first pressure is set as a function of at least one characteristic of the mail item currently to be stored, and the second pressure is set as a function of at least one characteristic of the mail item last stored.

10. The sorting system of claim 5, wherein a section of the roller belt unit facing the storage area is shorter than a defined shortest length of a mail item.

11. The sorting system of claim 5, wherein when the extraction function is in operation at least one pivotable support roller for supporting the last mail item stored in the stack is provided, with the at least one support roller being pivoted away from the last mail item stored when the insertion function is in operation.

12. The sorting system of claim 5, wherein one feed direction of the mail items runs in the stream of mail items at an angle to an orientation of the mail items in the storage area.

13. The sorting system of claim 5, wherein the storage area includes an underfloor belt configured to move in the stacking direction of the mail items or antiparallel to the stacking direction of the mail items.

* * * * *